United States Patent [19]

Kutschera

[11] Patent Number: 5,357,552
[45] Date of Patent: Oct. 18, 1994

[54] BEARING ARRANGEMENT FOR THE ROTATING ANODE OF AN X-RAY TUBE

[75] Inventor: Wolfgang Kutschera, Aurachtal, Fed. Rep. of Germany

[73] Assignee: Siemens Aktiengesellschaft, Munich, Fed. Rep. of Germany

[21] Appl. No.: 101,728

[22] Filed: Aug. 4, 1993

[30] Foreign Application Priority Data

Aug. 31, 1992 [DE] Fed. Rep. of Germany ....... 4228964

[51] Int. Cl.⁵ ........................................... H01J 35/10
[52] U.S. Cl. ..................................... 378/132; 378/125
[58] Field of Search ........................ 378/132, 133, 125

Primary Examiner—Craig E. Church
Attorney, Agent, or Firm—Hill, Steadman & Simpson

[57] ABSTRACT

The invention is directed to a bearing for the rotating anode of an x-ray tube comprising at least one rolling bearing suitable for absorbing axial forces which is loaded with an axially directed force for suppressing the bearing play. Magnets are provided which generate the axially directed force in non-contacting fashion.

10 Claims, 2 Drawing Sheets

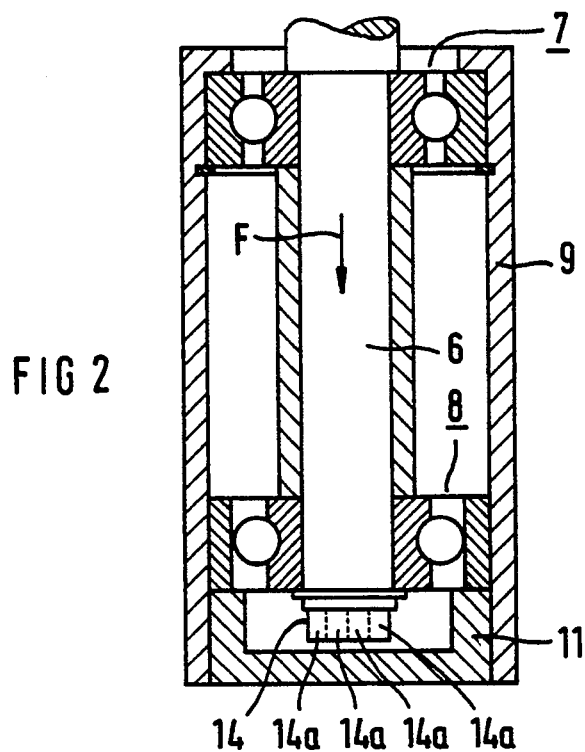
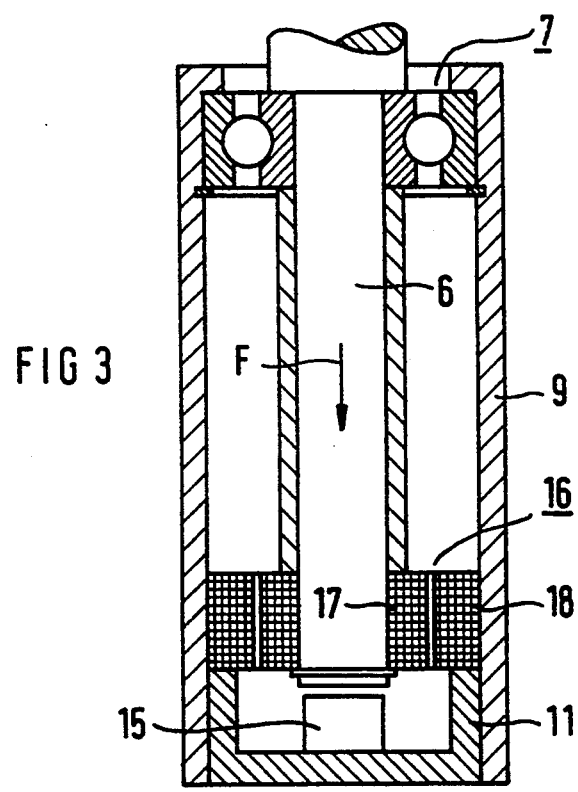

BEARING ARRANGEMENT FOR THE ROTATING ANODE OF AN X-RAY TUBE

BACKGROUND OF THE INVENTION

1. Field of the Invention

The present invention is directed to a bearing for the rotating anode of an x-ray tube.

2. Description of the Prior Art

When rotatably supporting a rotating anode with the assistance of one or more rolling bearings, difficulties in long-term operation of the x-ray tube arise in conjunction with the intense and partly non-uniform heating of the bearing. As a consequence of the heating, the radial air of the rolling bearing changes substantially, so that a seizing of the bearing and thus an outage of the x-ray tube is possible in the extreme case. In order to avoid this, such extensive bearing play is selected in practice for the rolling bearing that a seizing of the bearing is reliably precluded. In certain operating conditions of the x-ray tube, however, this leads to increased wear, and thus a shorter useful life, and also results in a greater development of noise and to relatively great displacements of the focus of the x-ray tube during operating.

In an effort to solve this problem, it has been proposed that rolling bearings, suitable for absorbing axial forces, be loaded with an axially directed force for suppressing the bearing play in addition to being loaded with the bearing forces that already occur due to the bearing of the rotating anode. German OS 15 89 893 and German PS 726 051 teach merely using the influence of the force of gravity to produce this force. This approach, however, is only practical when the rotating anode shaft is vertically oriented. Other solutions usually involve considerable structural outlay that causes corresponding increased costs. In the x-ray tube disclosed in German AS 10 21 511, for example, special curved washers are required for producing the axial force.

SUMMARY OF THE INVENTION

It is an object of the present invention to provide a bearing for the rotating anode of an x-ray tube, m of the type wherein the bearing is loaded with an axially directed force, which is constructed structurally simple and economically.

This object is achieved in accordance with the principles of the present invention in a bearing for the rotating anode of an x-ray tube wherein the axially directed force is generated and applied by magnetic means.

In accordance with the invention, thus, only a magnet and a ferromagnetic part which may, under certain circumstances, be a part of the bearing that is already present, or two magnets, are required in order to produce the axially directed force for suppressing the bearing play. The magnet or magnets are preferably permanent magnets that can be economically obtained. (Magnet means are contained in the x-ray tubes of aforementioned German OS 15 89 893 and German PS 726 051 but do not serve the purpose therein of generating an axially directed force.)

The invention yields the additional advantage that the axial force can be exerted in non-contacting fashion. Since the magnet means includes two magnetic means elements arranged at a spacing from one another, one magnetic element being connected to the bearing shaft of the rotating anode and the other being connected to the vacuum housing of the x-ray tube, an axial displacement of one of the ball races of the rolling bearing relative to the corresponding bearing seat is thus not required. This is in contrast to a solution disclosed in German Utility Model 87 05 478. The inventive structure insures that the proper function of the bearing is maintained after a longer time, which is not assured in solutions that require the displacement of a ball race relative to the corresponding bearing seat, since there is the risk in those types of structures that the ball race, which must unavoidably be displaceable loses its displaceability after some time due to the corrosion phenomena occurring between ball race and bearing seat. The inventive structure can also be utilized with particular advantage when the bearing is of the type having comprises a fixed bearing, fashioned as a ball bearing, and a movable bearing fashioned as a magnetic bearing, particularly a static magnetic bearing. In this case, the bearing play of the ball bearing provided as the fixed bearing can only be suppressed with an axial force when the axial force acts on the bearing shaft. In a bearing of this type, it is not possible to apply the axial force onto one of the ball races of the ball bearing, because the races must be axially non-displaceable relative to the bearing seat in order to guarantee the fixed bearing function.

DESCRIPTION OF THE DRAWINGS

FIGS. 2 and 3 respectively show further embodiments of the bearing of the rotating anode in accordance with the principles of the present invention.

DESCRIPTION OF THE PREFERRED EMBODIMENTS

Figure 1:
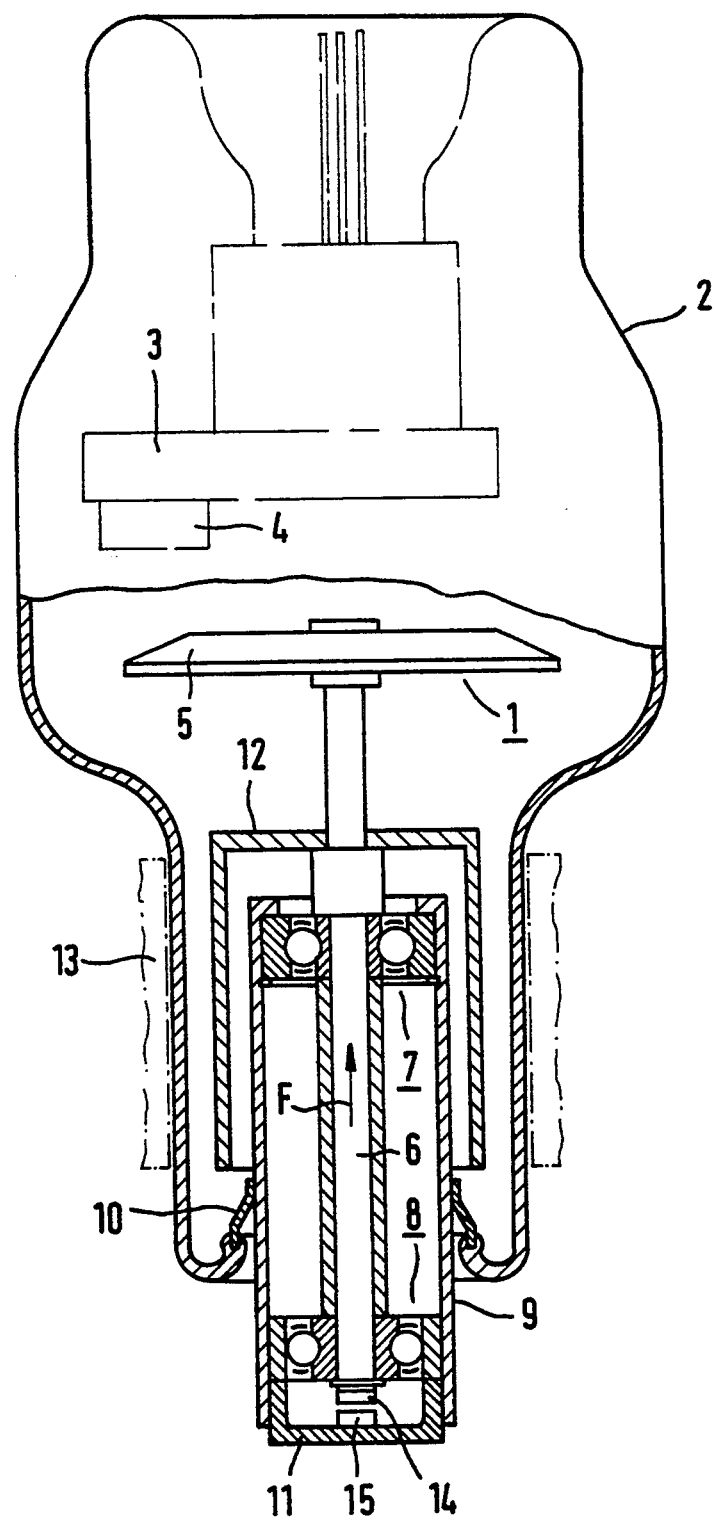
FIG. 1 illustrates an x-ray tube, shown partly in section, provided with a rotating anode seated in accordance with the principles of the present invention.

FIG. 1 shows an x-ray tube that having a rotating anode 1 that is accommodated in a vacuum bulb 2. The vacuum bulb 2 also contains a cathode 3 in a known way, having a glow coil (not visible in FIG. 1 ) in a concentrating cup 4.

The rotating anode 1 includes an anode dish 5 that is firmly attached to the one end of a bearing shaft 6. In order to rotatably support the rotating anode 1, two rolling bearings fashioned as ball bearings 7 and 8 are provided, whose respective inner ball races are attached to the bearing shaft 6. The respective outer races of the ball bearings 7 and 8 are accepted in the bore of a tubular section 9. The tubular section 9 is connected vacuum-tight to the vacuum bulb 2 with an annular, collar-like part 10, and has an end distal from the rotating anode 1 closed vacuum-tight by a base 11 attached an axially non-displaceably to the tubular section 9. The ball bearing 7 closer to the anode dish 5 is a fixed bearing, i.e. a groove-shaped track for the spherical rolling members is provided both in the outer and the inner ball races. Moreover, both the inner ball race on the bearing shaft 6 and the outer ball race in the bore of the tubular section 9 are fixed in axially non-displaceable fashion. As a consequence of its fashioning as a fixed bearing, the ball bearing 7 can absorb forces in the axial direction, i.e. in the direction of the longitudinal axis of the bearing shaft 6, as well as radial forces, i.e. forces transversely relative to the longitudinal axis of the bearing shaft 6.

The other ball bearing 8 is executed as a movable bearing, which is achieved in the exemplary embodiment of FIG. 1 by only its inner ball race having a groove-shaped track for the spherical rolling members, whereas the outer ball race is a cylindrical track. As a consequence of its fashioning as a movable bearing, the ball bearing 8 can only absorb radial forces.

In order to be able to place the rotating anode 1 in rotation, an electric motor is provided which has a rotor 12 formed by a cylindrical part fashioned of an electrically conductive material, which overlaps that end of the tubular section 9 facing the anode dish 5. A schematically indicated stator 13 surrounds the outer wall of the vacuum bulb 2 in the region of the rotor 12 and, together with the rotor 12, forms a squirrel-cage induction motor that allows the rotating anode 1 to rotate when supplied with voltage.

When the filament voltage for the glow coil of the cathode 3, and the x-ray tube voltage between cathode 3 and rotating anode 1, are applied to the x-ray tube in a standard way (not shown), an electron beam proceeds from the cathode 3, which is incident on the anode dish 5 in the focal spot, and triggers x-rays at that location which emerge from the x-ray tube through the vacuum bulb 2. As a consequence of the rotation of the rotating anode 1, a so-called focal spot path is formed, since successive locations on the surface of the anode dish 5 are constantly charged with the electron beam.

Because only approximately 1% of the electrical energy supplied to the x-ray tube is converted into x-radiation and the remaining energy is dissipated as heat, the anode dish 5 heats significantly during operation, resulting in the bearing shaft 6 and the ball bearings 7 and 8, particularly the ball bearing 7 situated closer to the anode dish 5, also being highly heated. In order to guarantee a proper operation of the bearing of the rotating anode 1 under these conditions, the bearing play of the ball bearings 7 and 8 must be selected in the cold condition such that seizing of the ball bearings 7 and 8 as a consequence of too little bearing play is precluded even given the most severe operation of the x-ray tube. In the cold condition of the x-ray tube, or when operated under partial load, such a large bearing play leads to rather loud running noise. Moreover, the large play has a disadvantageous effect on the useful life of the ball bearing. Moreover, the rotating anode can execute relatively large motions, so that the focus of the x-radiation does not assume a stationary position. In the event the anode current flows through one of or through the ball bearings, a large bearing play has a disadvantageous effect on the electrical contact conditions.

In order to be able to avoid these disadvantages occurring given a cold x-ray tube or given operation under partial load, magnet means are provided in the x-ray tube of the invention for loading the bearing shaft 6 with an axially directed force, which is illustrated as an arrow referenced F in FIG. 1, for suppressing the bearing play of the ball bearing 7 functioning as a fixed bearing. In the embodiment of FIG. 1, the magnet means comprise two magnetic elements, which are two permanent magnets 14 and 15, preferably of the same size and are preferably cylindrical. The permanent magnet 14 is secured to the bearing shaft 6 and the permanent magnet 15 is secured to the floor 11, such that the pole faces of the permanent magnets 14 and 15 facing one another are at a slight distance from one another, and proceed parallel to one another. The force F having the direction shown in FIG. 1 then arises when the two north poles or south poles face one another. A force F of the opposite direction arises when the permanent magnets 14 and 15 are respectively attached such to the bearing shaft 6 and to the base 11 such that a north pole and a south pole face toward one another.

The embodiment shown in FIG. 2 differs from that set forth above in that only one of the magnetic elements is a permanent magnet, namely the permanent magnet 14 connected to the bearing shaft. The permanent magnet 15 can be omitted in this embodiment since the base 11 is formed of a ferromagnetic material and serves as the second magnetic element in FIG. 2. As a consequence of the magnetic forces occurring between the permanent magnet 14 and the base 11, an axial force F in the direction entered in FIG. 2 arises.

The embodiment of FIG. 3, wherein again only one of the magnetic elements is a permanent magnet, differs from that of FIG. 2 in that the permanent magnet 14 was omitted instead of the permanent magnet 15. The permanent magnet 15 is secured to the base 11 and interacts with the bearing shaft 6, formed of a ferromagnetic material, to produce the axially directed force F that has the same direction as in FIG. 2. The exemplary embodiment of FIG. 3 also differs from that of FIG. 2 in that a schematically indicated static magnetic bearing 16 is provided as movable bearing instead of the rolling bearing 8. The rotor 17 of this static magnetic bearing 16 is connected to the bearing shaft 6, and the stator 18 thereof surrounds the tubular section 9.

In the exemplary embodiments that have been set forth, both the magnet connected to the bearing shaft 6 and the magnet connected to the base 11 are implemented as permanent magnets 14 or 15. Without difficulty, however, it is possible at least with respect to the magnet secured to the base 11, to fashion this magnet as an electromagnet.

Differing from the exemplary embodiments that have been set forth, there is also the possibility to support the rotating anode I such that the outer ball races of the ball bearings 7 and 8 rotate and the inner ball races are stationary, or such that the static magnetic bearing has a rotor that surrounds the stator. In this case, the bearing shaft would be implemented as a tubular component that accepts the outer ball races of the ball bearings 7 and 8 or the rotor of the static magnetic bearing 16. The function of the tubular section 9 would be assumed by a stationary axle. One magnetic element of the magnetic means in the case of such a bearing would have to be attached to the end of the tubular component that functions as the bearing shaft, or would have to formed by this tubular component. The other magnetic element would have to be attached to a stationary component at a suitable location, or would have to formed by a suitable, stationary component part.

Moreover, the respective a magnetic elements need not necessarily contain only a single magnet. One or both magnetic elements can contain a plurality of magnets, as is indicated with broken lines for the magnetic element of the exemplary embodiment of FIG. 2. As may be seen from FIG. 2, the magnet 14 need not be a single magnet. As indicated in FIG. 2, this can be composed of a plurality of small magnets 14a. These are then preferably arranged such that only magnetic poles of the same polarity face toward the other magnetic element, i.e., the base 11 in FIG. 2, so that the force F is maximum.

In the case of all exemplary embodiments the spacing between the magnetic elements is selected such that it is impossible for the magnetic elements to touch one another even under unfavorable conditions.

Although modifications and changes may be suggested by those skilled in the art, it is the intention of the inventor to embody within the patent warranted hereon all changes and modifications as reasonably and properly come within the scope of his contribution to the art.

Although ball bearings are used in the described embodiments, other suitable types of rolling bearings can be used for the fixed and/or the movable bearing.

I claim as my invention:

1. A bearing arrangement for use in an x-ray tube having a rotating anode with an axially extending shaft, said arrangement comprising:
   rolling bearing means for bearing said shaft and for absorbing axial forces; and
   magnet means for generating an axially directed force acting on said rolling bearing means for suppressing play in said rolling bearing means.

2. A bearing arrangement as claimed in claim 1 wherein said x-ray tube has an evacuated housing, and wherein said magnetic means comprises:
   first and second magnetic elements spaced from each other, said first magnetic element being connected to said shaft and said second magnetic element being connected to said housing.

3. A bearing arrangement as claimed in claim 2 wherein one of said first or second magnetic elements comprises a one magnet and the other of said first or second magnetic elements comprises a ferromagnetic component.

4. A bearing arrangement as claimed in claim 2 wherein each of said first and second magnetic elements comprise a magnet.

5. A bearing arrangement as claimed in claim 2 wherein in one of said first or second magnetic elements consists of a plurality of magnets, said magnets in said plurality of magnets being arranged with only magnetic poles of the same polarity in said plurality of magnets facing toward the other of said first or second magnetic elements.

6. A bearing arrangement as claimed in claim I wherein said x-ray tube has an evacuated housing, and wherein said magnetic means comprises: a magnet connected to said housing and a ferromagnetic component spaced from said magnet, and wherein said shaft has at least a portion thereof containing ferromagnetic material forming said ferromagnetic component.

7. A bearing arrangement as claimed in claim I wherein said x-ray tube has an evacuated housing, and wherein said magnetic means comprises:
   a magnet connected to said shaft and a ferromagnetic component spaced therefrom, said housing having at least a portion thereof containing ferromagnetic material forming said ferromagnetic component.

8. A bearing arrangement as claimed in claim I wherein said rolling bearing means comprises:
   an axially fixed ball bearing; and
   an axially movable ball bearing.

9. A bearing arrangement as claimed in claim 1 wherein said rolling bearing means comprises a rolling bearing as a fixed bearing and wherein a magnetic bearing is provided as a movable bearing.

10. A bearing arrangement as claimed in claim 9 wherein said magnetic bearing is a static magnetic bearing.

* * * * *